US008434080B2

(12) United States Patent
Yendluri (10) Patent No.: US 8,434,080 B2
(45) Date of Patent: Apr. 30, 2013

(54) DISTRIBUTED CLOUD APPLICATION DEPLOYMENT SYSTEMS AND/OR ASSOCIATED METHODS

(75) Inventor: Prasadarao Yendluri, San Jose, CA (US)

(73) Assignee: Software AG USA, Inc., Reston, VA (US)

( * ) Notice: Subject to any disclaimer, the term of this patent is extended or adjusted under 35 U.S.C. 154(b) by 0 days.

(21) Appl. No.: 13/335,205

(22) Filed: Dec. 22, 2011

(65) Prior Publication Data

US 2012/0102486 A1    Apr. 26, 2012

(51) Int. Cl.
*G06F 9/445*       (2006.01)

(52) U.S. Cl.
USPC .......................................................... 717/177

(58) Field of Classification Search .................... 717/177
See application file for complete search history.

(56) References Cited

U.S. PATENT DOCUMENTS

| | | | |
|---|---|---|---|
| 5,987,506 A * | 11/1999 | Carter et al. .................. | 709/213 |
| 6,681,221 B1 * | 1/2004 | Jacobs ................................. | 1/1 |
| 2009/0228967 A1 * | 9/2009 | Gbadegesin et al. ............. | 726/8 |
| 2011/0055707 A1 * | 3/2011 | Kimmet ......................... | 715/735 |
| 2011/0061090 A1 * | 3/2011 | Gillespie et al. .................. | 726/3 |
| 2011/0138034 A1 * | 6/2011 | Brookbanks et al. .......... | 709/224 |

OTHER PUBLICATIONS

AMI Basics—Amazon Elastic Compute Cloud [retrieved Dec. 21, 2011] http://docs.amazonwebservices.com/AWSEC2/latest/UserGuide/ComponentsAMIs.html.

Open Virtualization Format (OVF)—Virtual Machines—Virtualization [retrieved Dec. 21, 2011] http://www.vmware.com/appliances/getting-started/learn/ovf.html.
OTIXO: All Your Cloud Files From a Single Login. Retrieved Dec. 10, 2012. http://otixo.com/.
OTIXO: Product and Features. "Your Dashboard for the Cloud." Retrieved Dec. 10, 2012. http://otixo.com/product.
OTIXO: Spaces. "Collaborate without Boundaries." Retrieved Dec. 10, 2012. http://otixo.com/spaces.
OTIXO: The Blog. "CX Blog About Denver Startup Week & DEMOgala." Retrieved Dec. 10, 2012. http://blog.otixo.com/.
OTIXO: Security. "Your Security." Retrieved Dec. 10, 2012. http://otixo.com/security.
OTIXO: The Blog. "Otixo for your Desktop." Retrieved Dec. 11, 2012. http://blog.otixo.com/Apr. 2011.
CrunchBase. Otixo. Retrieved Dec. 11, 2012. http://www.crunchbase.com/company/otixo.
AppAppeal. Otixo-Cross Service File Manager. Retrieved Dec. 11, 2012. http://otixo.appappeal.com/.
Gideon Juve et al., "Automating Application Deployment in Infrastructure Clouds," 2011 Third IEEE International Conference on Cloud Computing Technology and Science, Nov. 29, 2011, pp. 658-665.

(Continued)

*Primary Examiner* — Wei Zhen
*Assistant Examiner* — Lanny Ung
(74) *Attorney, Agent, or Firm* — Nixon & Vanderhye PC (57) ABSTRACT

In certain example embodiments, distributed cloud application deployment systems (DCADS), and/or associated methods are provided. A formal description of the cloud application is created. The cloud application's formal representation, with its constituent nodes and their associated properties and interfaces, etc., is exported to a machine processable form. The exported DCADS machine processable rendition and any needed implementation artifacts are retrieved by a cloud application deployer that helps facilitate the deployment of the cloud application into the distributed and heterogeneous cloud environments as prescribed in the DCADS.

30 Claims, 9 Drawing Sheets

OTHER PUBLICATIONS

Xiaoxin Wu et al., "Jump-Start Cloud: Efficient Deployment Framework for Large-Scale Cloud Applications," Feb. 9, 2011, pp. 112-125.

Mark Wallis et al., "Expanding the Cloud: A Component-Based Architecture to Application Deployment on the Internet," 2010 10th IEEE/ACM International Conference on Cluster, Cloud and Grid Computing, May 17, 2010, pp. 569-570.

Pei Fan et al., "Toward Optimal Deployment of Communication-Intensive Cloud Application," 2011 IEEE 4th International Conference on Cloud Computing, Jul. 4, 2011, pp. 460-467.

Rui Han et al., "A Deployment Platform for Dynamically Scaling Applications in the Cloud," 2011 Third IEEE International Conference on Cloud Computing Technology and Science, Nov. 29, 2011, pp. 506-510.

IP.com Prior Art Database, "Cloud Instance Role System to Trigger Application Deployment Dynamically," Nov. 1, 2011.

Vincent C. Emeakaroha et al., "SLA-Aware Application Deployment and Resource Allocation in Clouds," 2011 35th Annual Computer Software and Applications Conference Workshops, Jul. 18, 2011, pp. 298-303.

* cited by examiner

```
<dcads:CloudApp name="myCloudApp"
    targetNamespace="http://www.softwareag.com/dcads"
    xmlns:dcads="http://www.softwareag.com/dcads">

<documentation xml:lang="EN">
     A simple example description of a Distributed Cloud Application,
in DCADS.
    </documentation>

<types>
        <xs:schema xmlns:xs="http://www.w3.org/2001/XMLSchema">

<xs:element name="AppNodeProperties">
                <xs:complexType>
                    <xs:sequence>
                        <xs:element name="Owner" type="xs:string"/>
                        <xs:element name=Contact" type=xs:string">
                            ............
                    </xs:sequence>
                </xs:complexType>
            </xs:element>
                ............
        </xs:schema>

</types>

<-! Definition of Nodes in the Application follows -->
 <Node id="AppNode1" name="My-Application-Node1">

<Properties>
       <AppNodeProperties>
         <Onwer>Rob</Owner>
         <Contact>+1-800-555-1212</Contact>
                ............
         <DeploymentOrder>1</DeploymentOrder>
         <implementation location=URI"/>+
         <!-Other AppNode Specific Properties -->
                ............

<!-Cloud Provider Specific Properties -->
         <CloudProviderProperties>
             <Provider-Type>Public-Cloud</Provider-Type>
             <preferred-Provider>
                 <QName for Amazon EC2>
             </preferred-Provider>
                ............
                ............
         </CloudProviderProperties>

</AppNodeProperties>

<Policies>?
          <Policy name="string" type="anyURI">+
          policy specific content
       </Policies>
```

Fig. 5a

```xml
    </Properties>

<Interfaces>
    <-! The "location" attribute on the "WSDL" element may include a
URI providing the location of a WSDL document that contains the com-
plete relevant definitions, or concrete bindings for the interfaces.
The WSDL definitions and hence bindings may follow standard WSDL
(e.g., either WSDL 1.1 or WSDL 2.0) syntax.  See:
http://schemas.xmlsoap.org/wsdl/ (WSDL 1.1) and/or
http://www.w3.org/TR/2007/REC-wsdl20-20070626/ (WSDL 2.0). Existing
standards may be leveraged and/or custom standards may be developed
in different example embodiments.
    -->
    <-! Note that for REST style interfaces, the "method" attribute
Concretely provides the binding. Viz. HTTP GET, HTTP PUT etc.
    -->
       <Interface name="iNodeIl1" type="invokes">
          <!- Could be a WSDL porttype or a REST interface etc. -->
           <WSDL portType="QName" location="anyURI"
              operation="NCName"?>+
           |
          <REST method="GET | PUT | POST | DELETE"
              requestURI="anyURI"
              requestPayload="QName"?
              responsePayload="QName"?>+
       </Interface>

<Interface name="iNodeIl2" type="exposes">
          <!- Could be a WSDL porttype or a REST interface etc. -->
           <WSDL portType="QName" location="anyURI"
              operation="NCName"?>+
           |
          <REST method="GET | PUT | POST | DELETE"
              requestURI="anyURI"
              requestPayload="QName"?
              responsePayload="QName"?>+
       </Interface>

</Interfaces>
 </Node>

<Node id="AppNode2" name="My-Application-Node2">

<Properties>
       <AppNodeProperties>
          <Onwer>Terry</Owner>
          <Contact>+91-40-800-1212</Contact>
              ...........
          <DeploymentOrder>2</DeploymentOrder>
          <implementation location=URI"/>+
          <!-Other AppNode Specific Properties -->
              ...........

<!-Cloud Provider Specific Properties -->
          <CloudProviderProperties>
```

Fig. 5b

```
            <Provider-Type>Private-Cloud</Provider-Type>
            <preferred-Provider>
                <QName for Private Eucalyptus Cloud Environment>
            </preferred-Provider>
            ............
            ............
        </CloudProviderProperties>

</AppNodeProperties>
    </Properties>

<Policies>?
         <Policy name="string" type="anyURI">+
          policy specific content
      </Policies>

<Interfaces>
      <Interface name="iNode2I1" type="exposes">
         <!- Could be a WSDL porttype or a REST interface etc. ->
         <WSDL portType="QName" location="anyURI"
               operation="NCName"?>+
         |
         <REST method="GET | PUT | POST | DELETE"
               requestURI="anyURI"
               requestPayload="QName"?
               responsePayload="QName"?>+
      </Interface>

<Interface name="iNode2I2" type="invokes">
         <!- Could be a WSDL porttype or a REST interface etc. ->
         <WSDL portType="QName" location="anyURI"
               operation="NCName"?>+
         |
         <REST method="GET | PUT | POST | DELETE"
               requestURI="anyURI"
               requestPayload="QName"?
               responsePayload="QName"?>+
      </Interface>
    </Interfaces>
 </Node>

<Interface-Matching>
 <match id="matchA" name"MatchA">
     <source>iNode1I1</source>
     <target>iNode2I1</target>
 </match>

<match id="matchB" name"MatchB">
     <source>iNode2I2</source>
     <target>iNode1I2</target>
 <match>

</Interface-Matching>

</dcads:CloudApp>
```

Fig. 5c

```
<Interface name="getUsageMetrics" type="exposes">
    <!- A WSDL portType definition of the interface exposed ->
        <WSDL portType="appNodeMetrics"
            location="http://www.softwareag.org/wsdl/metrics.wsdl"
            operation="getUsageMetrics"?>+
</Interface>
```

Fig. 6

```
<wsdl:definitions
        targetNamespace="http://www.softwareag.org/wsdl/metrics"
        xmlns:gms="http://www.softwareag.org/xsd/metrics"
        xmlns:wsdm="http:// www.softwareag.org/wsdl/metrics"
        xmlns:wsdl="http://schemas.xmlsoap.org/wsdl/"
        xmlns:xsd="http://www.w3.org/2001/XMLSchema">

<wsdl:types>
      <xsd:schema>
        <xsd:import namespace="http://www.softwareag.org/xsd/metrics"
           schemaLocation="http://www.softwareag.org/xsd/metrics.xsd" />
      </xsd:schema>
   </wsdl:types>

<wsdl:message name="inputMessage">
       <wsdl:part name="myCredentials" type="gms:CredentialInfoType" />
       <wsdl:part name="timeWindow" type="gms:TimeWindowType" />
   </wsdl:message>

<wsdl:message name="outputMessage">
       <wsdl:part name="Metrics" type="gms:MetricsType" />
   </wsdl:message>

<wsdl:portType name="appNodeMetrics">
       <wsdl:operation name="getUsageMetrics">
          <wsdl:input message="wsdm:InputMessage" />
          <wsdl:output message="wsdm:outputMessage" />
       </wsdl:operation>
   </wsdl:portType>
......
......
</wsdl:definitions>
```

Fig. 7

```
<Node id="AppNode1" name="My-Application-Node1">

<Properties>
     <AppNodeProperties>
        <Owner>Rob</Owner>
        <Contact>+1-800-555-1212</Contact>
                ............
        <DeploymentOrder>1</DeploymentOrder>
        <MinInstanceCardinality>2</MinInstanceCardinality>
        <MaxInstanceCardinality>5</MaxInstanceCardinality>
        <AvailabilityZone>NorthAmerica US-East</AvailabilityZone>
        <AvailabilityZone>Europe EU-West</AvailabilityZone>
        <implementation location=URI"/>+
        <!- additional artifacts such as configfiles etc. needed -->
        <supportingArtifacts location="URI">+
        <!-Other AppNode Specific Properties -->
                ............

<!-Cloud Provider Specific Properties -->
        < CloudProviderProperties>
             <Provider-Type>Public-Cloud</Provider-Type>
             <preferred-Provider>
                 <QName for Amazon EC2>
             </preferred-Provider>
             <DeploymentEnvironment>
                <OperatingSystem>Windows 7</OperatingSystem>
                <runtime>Java SE 1.6.2</runtime>
                <moduleSystem>OSGi 4.2</moduleSystem>
                <webContainer>Tomcat 7.0</webContainer>
                <securityEnvironment>
                   <authenticationsystem>
                      Kerberos krb5-1.9.2
                   </authenticationsystem>
                   <accessControl>...</accessControl>
                </securityEnvironment>
                <database>Amazon RDS</database>
                <messagingSystem>Amazon SQS</messagingSystem>
                <storageSystem>Amazon S3</storageSystem>
             </DeploymentEnvironment>
                ............
                ............
         </CloudProviderProperties>

</AppNodeProperties>
   </Properties>
```

Fig. 8

DISTRIBUTED CLOUD APPLICATION DEPLOYMENT SYSTEMS AND/OR ASSOCIATED METHODS

FIELD OF THE INVENTION

Certain example embodiments described herein relate to distributed cloud application deployment systems, and/or associated methods. In certain example embodiments, a cloud application is broken down at design time into cloud application compositions that provide formal representations of the application's nodes and their corresponding properties and interfaces, and machine processable renditions of these compositions may be read so that the nodes can be deployed into heterogeneous distributed cloud provider environments.

BACKGROUND AND SUMMARY OF EXAMPLE EMBODIMENTS OF THE INVENTION

In the computer systems architecture world, cloud computing has recently received some attention. Although there are many competing definitions for "cloud computing," it generally involves (1) the delivery of computing as a service rather than a product, and (2) providing shared processing and/or storage resources, software, information, etc., to computers and other devices as an oftentimes metered service over a network (typically the Internet). In a cloud computing environment, end users do not necessarily need to know the physical location and configuration of the system that delivers the services. Applications typically are delivered to end-users as the service, enabling transparent access to the cloud-based resources.

An interesting trend within cloud computing relates to the emergence of "hybrid" cloud solutions that span multiple (cloud) environments that were historically isolated from one another. In a typical such scenario, a cloud application comprises parts that must remain within enterprise IT boundaries (e.g., a private cloud) while other parts are deployed into a third-party hosted cloud infrastructure. An example of parts of a cloud application that must remain within enterprise confines may include, for example, application components that manipulate and utilize enterprise sensitive data. By contrast, other parts of the application such as end-user oriented parts or parts that need to integrate with partner solutions, etc., may be deployed into third-party cloud infrastructure (e.g., for the benefits offered by hosted cloud environments such as, for example, elastic scaling, efficient resource utilization, capital expenditure cost reduction, etc.).

Cloud technology is still developing and indeed is still be defined in some respects, and further refinements are still being sought after in both the theoretical and practical worlds. The emergence of hybrid cloud solutions also presents several practical challenges. For instance, enterprise class and other vendors are concerned with security, privacy, availability of cloud provider infrastructure, etc.—as well as the sometime apparent lack thereof. As a result, vendors oftentimes would like to keep enterprise-sensitive data and/or related logic within the enterprise controlled private-cloud environments.

Additionally, even for components of the cloud application that are deemed to be safely deployable into public cloud environments, it sometimes is desirable to deploy additional instances of those components dynamically for load-balancing, performance, fail-over, and/or other purposes. These additional instances may be deployed into the same cloud-provider as the original instance within the same or different availability zone(s), or even into an entirely different cloud provider, e.g., when the original cloud provider experiences an outage.

Thus, it will be appreciated that there is a need in the art for improved cloud computing techniques that take into account these and/or other concerns, particularly where hybrid environments are concerned.

One aspect of certain example embodiments relates to a mechanism that enables the description of cloud applications with multiple constituent parts that can be deployed into heterogeneous cloud environments (e.g., hybrid cloud solutions). In certain example embodiments, these techniques help facilitate the above-described and/or other scenarios that often arise in cloud computing environments.

Cloud application descriptions are just emerging as a concept, and it is believed that the current state of the art describes cloud applications as deployable into a single cloud provider environment (e.g., as a cloud appliance) and does not address cloud application deployment over heterogeneous and distributed cloud environments that span both private and public cloud environments, from different vendors. Additionally, it is believed that current cloud application descriptions do not address load-balancing and fail-over deployment, or the ability to designate certain parts of the cloud application to be constrained for deployment into discrete, defined zones (e.g., enterprise private cloud environments only). Indeed, it is believed that currently emerging proposals are limited to describing an application deployment into a single cloud provider environment, mostly defined by Cloud Providers, to facilitate deployment of applications into their own cloud infrastructure. Examples of such descriptions are Amazon EC2's AMI (Amazon Machine Image) and the OVF (Open Virtualization Format).

Thus, it will be appreciated that there is need to facilitate the description of cloud applications with constituent parts that are distributed over heterogeneous cloud environments including, for example, private, public, and community cloud infrastructures.

As will become apparent from the detailed description below, one aspect of certain example embodiments relates to techniques that facilitate the deployment description of distributed cloud applications that span private and public cloud environments, while also potentially enabling fail-over and load-balancing measures to be implemented.

Another aspect of certain example embodiments relates to techniques for identifying different cloud deployable units of a cloud application, properties on each describing the nature of the application, configuration and requirements on the cloud provider environments that these application units may be deployed into, and/or the like. In certain example implementations, the properties on each unit can also include attributes that specify criteria for deploying additional instances of the unit into cloud provider and fail-over deployment.

In certain example embodiments, a computer-implemented method for setting up a cloud application in a heterogeneous distributed cloud provider environment including multiple computer systems is provided. The computer systems are operated by different cloud providers. The cloud application is defined in terms of constituent nodes, with each said node representing a part thereof that is to be deployed into a single one of said computer systems that satisfies deployment requirements of that node. Properties identifying deployment requirements of, and application level instantiation logic for, each said node, are defined. For each said node, any (e.g., one or more) interfaces that are invokable by one or more other nodes are exposed. For each said node, any (e.g., one or more) interfaces that it will invoke on one or more other nodes are identified. Exposed interfaces and complementary invokable interfaces are matched with one another.

In certain example embodiments, there is provided a computer-implemented method for setting up an application in a cloud computing network environment in which different cloud providers operate respective computer processing systems.

A definition of the cloud application that includes a list of its constituent nodes is received, with each said node representing a part thereof that is to be deployed into a single one of said computer processing systems, and with the definition including lists of predefined deployment requirements of, and application level instantiation logic for, each said node, as well as matches between exposed and invokable interfaces of complementary ones of said nodes. The nodes are deployed to the computer processing systems in dependence on the definition of the cloud application, such that the nodes are able to operate on the computer processing systems to which they are deployed, given requirements of the nodes and capabilities of the computer processing systems, with the capabilities of the computer processing systems depending at least in part on the processors and infrastructure configurations thereof.

Non-transitory computer readable storage mediums tangibly storing instructions for performing the above-summarized and/or other methods also are provided by certain example embodiments, as well as corresponding computer programs.

Systems and or computer based apparatus may also be configured or adapted to implement the above-summarized and/or other methods provided in certain example embodiments.

For instance, in certain example embodiments, a cloud application design system for setting up a cloud application in a heterogeneous distributed cloud provider environment including multiple computer systems is provided. The computer systems are operated by different cloud providers. At least one processor is provided. A user interface operating under the control of the at least one processor is configured to receive input: (a) defining the cloud application in terms of constituent nodes, with each said node representing a part thereof that is to be deployed into a single one of said computer systems that satisfies deployment requirements of that node, (b) defining properties identifying deployment requirements of, and application level instantiation logic for, each said node, (c) indicating, for each said node, one or more interfaces that are to be exposed as invokable by one or more other nodes, (d) identifying, for each said node, one or more interfaces that it will invoke on one or more other nodes, and (e) indicative of how exposed interfaces are to be matched to complementary invokable interfaces. A first storage location (which may be non-transitory in certain example instances) is configured to store the input in a predefined format. A second storage location (which may be non-transitory in certain example instances) is configured to store artifacts used in supporting the application level instantiation logic of the nodes.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIGS. 5a-c show an example DCADS XML rendition in mixed pseudo-schema form in accordance with certain example embodiments;

FIG. 8 sets forth additional properties that may be defined on an example app-node in accordance with certain example embodiments.

DETAILED DESCRIPTION OF EXAMPLE EMBODIMENTS OF THE INVENTION

Figure 1:
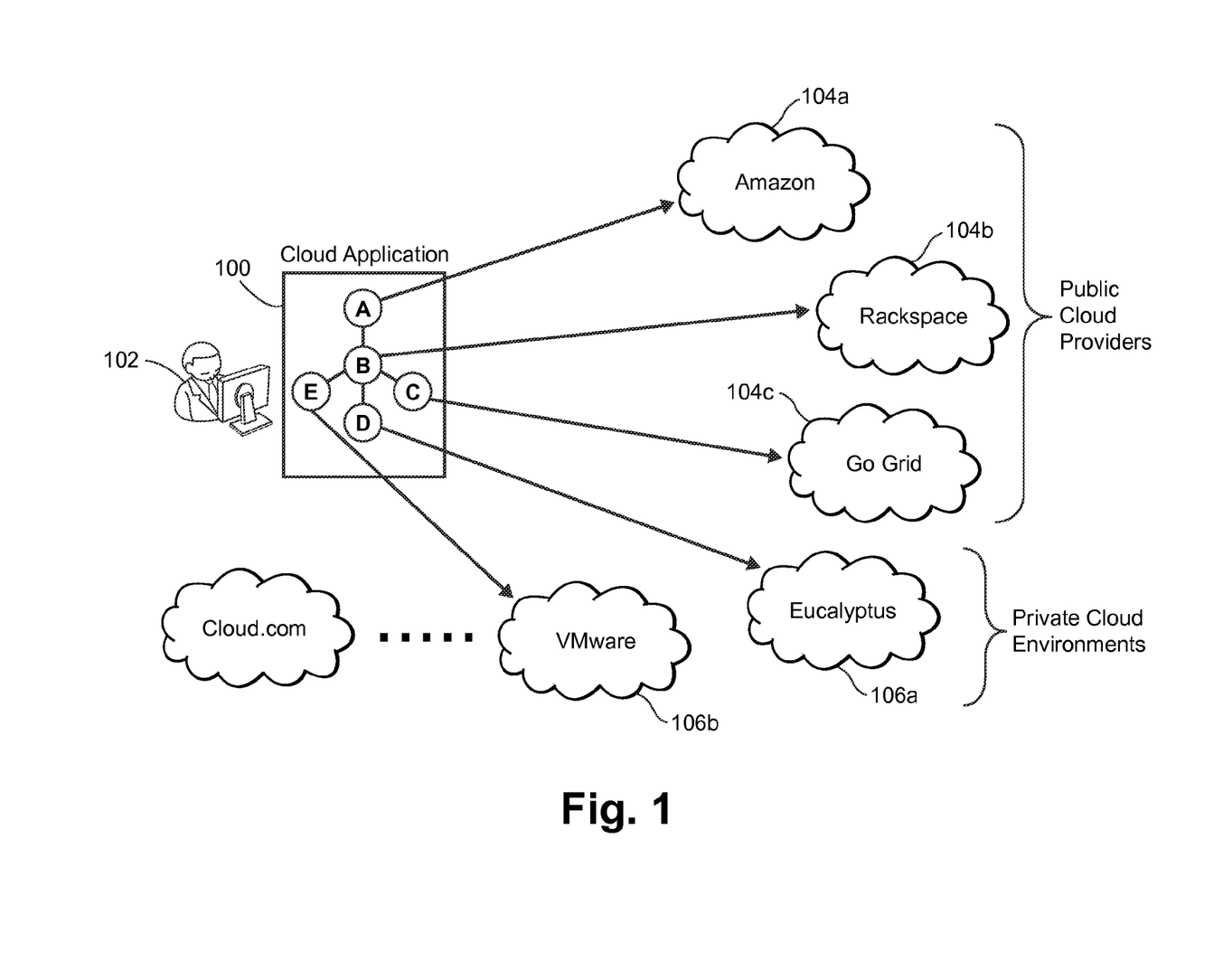
FIG. 1 is a schematic view of a cloud application being deployed into heterogeneous cloud provider environments.

With cloud computing beginning to mature and gain wider general acceptance, many organizations are considering modifying their existing applications or creating new applications that can be deployed into hosted cloud environments. However, organizations are also aware of security risks and vulnerabilities associated with third-party cloud providers and public cloud environments. Consequently, it would be desirable for organizations to architect cloud applications to straddle both public and private cloud environments so that parts of the application that handle enterprise sensitive information (continue to) reside in an enterprise private cloud environment, while other parts can be deployed into third-party cloud infrastructures. For generalization of this concept and for enhanced flexibility, cloud applications may be designed so that various parts of the application are potentially deployable into different cloud providers (e.g., parts that get deployed into a partner/customer-preferred cloud provider). FIG. 1 is a schematic view of a cloud application being deployed into heterogeneous cloud provider environments.

As shown in FIG. 1, a cloud application 100 that is usable by an end-user 102 includes multiple parts or nodes A-E. Parts A-C are deployed into public cloud provider environments 104a-c, respectively and parts D-E) deployed into private cloud environments 106a-b, respectively. It is noted that the cloud providers/vendors provided in the FIG. 1 illustrated are provided for example purposes only. It also is noted that the concept of Virtual Private Clouds (VPCs) exists. VPCs are private areas in a public cloud that a vendor can set-up for its exclusive use, but are still under the control of the cloud provider and exist in their infrastructure, outside the firewall of the vendor. Thus, they are considered part of the "public cloud" overall, as they are not within the firewall bounds of an enterprise as is the case with true private cloud environments. In this context, VPCs nonetheless can be considered a third class of cloud environments.

Referring once again to FIG. 1, it will be appreciated that the example deployment shown therein comprises multiple public and private cloud providers. While FIG. 1 is somewhat atypical in this respect, it illustrates the potential flexibility that is possible, even though many typical scenarios involve only one private cloud and one or more public cloud providers. Although not shown in FIG. 1, in some cases, it may also be necessary or desirable to deploy multiple instances of a particular part of the application (e.g., node B) into different cloud providers (one instance in cloud provider X, one in provider Y, and so on), and/or in different availability zones of the same cloud provider. It also may be necessary or desirable to move a particular node from one provider to another, and/or to create a new instance, when one node goes down (e.g., because of a provider's failure, etc.).

To enable the creation of example cloud computing applications of this sort, certain example embodiments involve design-time creation of cloud application compositions for deployment into heterogeneous distributed cloud provider environments.

In certain example embodiments, a cloud application designer (or team) defines the cloud application node composition. Each node in the application represents part of a cloud application to be deployed as a whole into a single cloud provider that satisfies the deployment requirements of the node.

The cloud deployment requirements of each of the nodes may be specified as properties on the node objects as <Name, Value> pairs. These include the cloud provider specific infrastructure as a service (IaaS) capabilities such as compute, storage, network, operating system, virtualization environment, container/runtime environments (e.g., Java Virtual Machine or JVM), business process management (BPM) container requirements, up-time or availability requirements, processing power or processing resources, etc. The properties may include pointers (e.g., Universal Resource Identifiers or URIs) to other artifacts associated with the node including, for example, an associated "policy" in such standards as WS-Policy and WS-SecurityPolicy.

Each node may also point to a code or implementation for the node's application level instantiation logic, e.g., via specific properties on the node. The implementations again may be a pointer to other standard descriptions for components such as Service Component Architecture (SCA) contributions, jar and ear archives, OSGi bundles, etc., specified as the value to an "implementation" property. Additional properties pertinent to semantics associated with a component may be supplied or captured, for example, in machine processable renditions such as Resource Definition Framework (RDF) and pointed to via a URI in the "value" of a property.

Each node may also expose interfaces that one or more other nodes in the cloud application composition may invoke. Additionally, a node may define interfaces it will invoke on other nodes in the cloud application. In certain example implementations, for a cloud application's composition to be considered complete, all interfaces exposed by a node must be satisfied by matching them with complementary interfaces of the other nodes in the cloud application composition. Moreover, in certain example instances, a node may expose an interface only if it needs to interact with another node during the operation of the cloud application. When an interface is exposed, concrete details of the interface including the nature of the interface and specific binding for invocation may be specified. See, for example, the further example below, as well as FIGS. 6-8.

Figure 2:
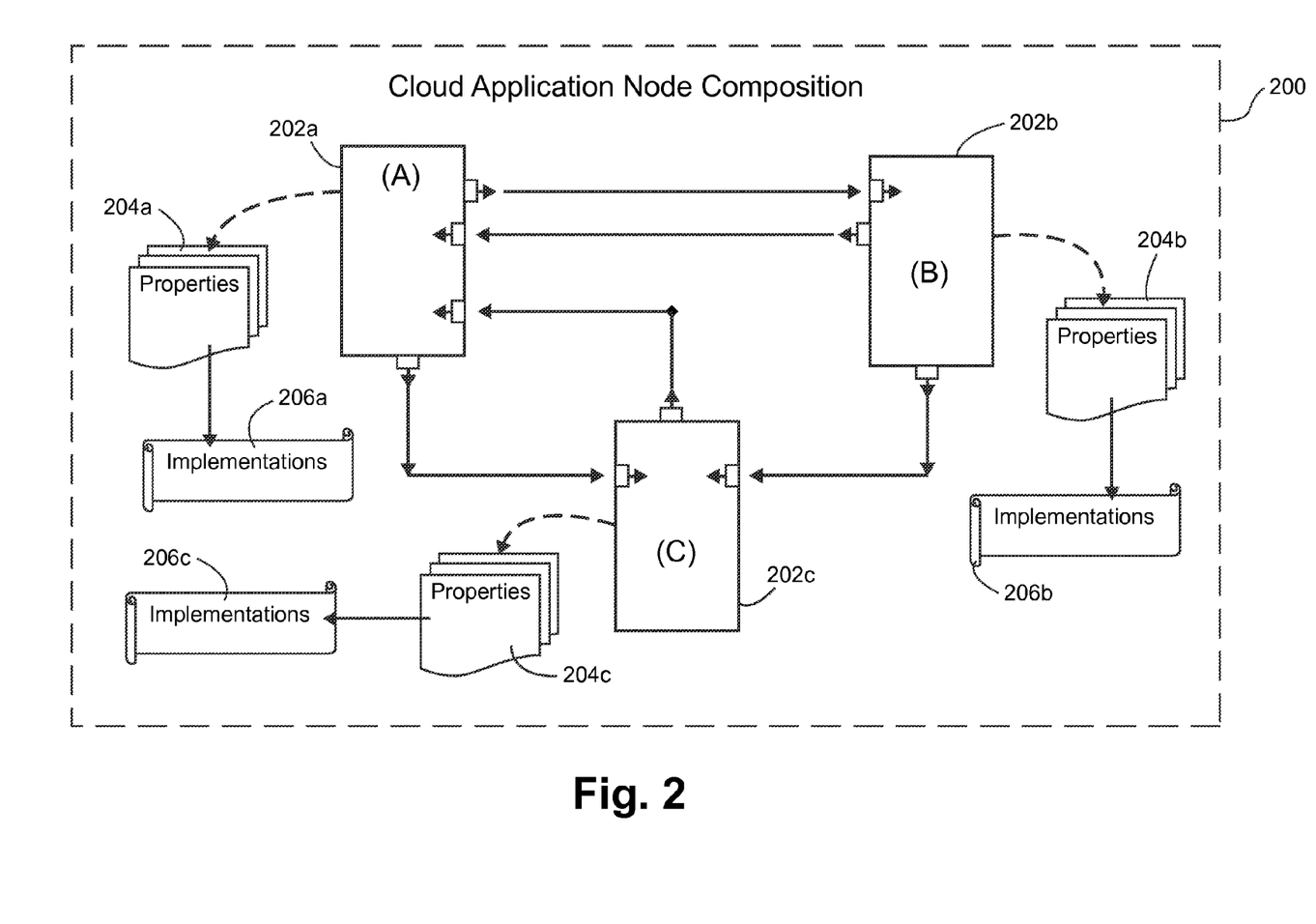
FIG. 2 is a simplified view illustrating cloud application node composition and interface matching in accordance with certain example embodiments.

FIG. 2 is a simplified view illustrating cloud application node composition and interface matching in accordance with certain example embodiments. The example cloud application deployment 200 in FIG. 2 includes three example nodes, 202a-c. Groups of properties 204a-c are specified for the nodes 202a-c, respectively, with the properties 204a-c reflecting cloud deployment requirements for the associated nodes 202a-c, e.g., as <Name, Value> pairs. As can be seen, each node 202a-c, through its associated properties 204a-c, may point to code or implementation details 206a-c, respectively. The nodes' interfaces with one another also are shown, e.g., as the arrows among and between the nodes 202a-c. Incoming and outgoing interface dependencies are set forth for each node, and the FIG. 2 example may be considered complete because each and every interface exposed by each node is matched with a complementary interface of another node in the cloud application composition. Although one-to-one mappings are shown in FIG. 2, other example embodiments may involve different cardinalities such as, for example, one-to-many, and many-to-one.

Depending on the security requirements of the application as a whole and specific application nodes in particular, secure communication channels may be specified and utilized for communications between the nodes, e.g., via the inter-node interaction interfaces. For instance, the HTTP(S) protocol may be used for securing a HTTP-based communication channel, although other authentication mechanisms such as, for example, PKCS, DES, 3DES, and/or the like, may be used in this and/or other contexts. The example Distributed Cloud Application Deployment System (DCADS) scheme described herein, for example, does not always necessarily prescribe or require any particular security mechanism. Designers of the cloud application (nodes) and the interaction interfaces are free to choose any and all security mechanisms that are appropriate and suitable for their purposes.

It will be appreciated that the interfaces above are not what the cloud application (nodes) will expose to its consumers, but instead are meant for coordination and interaction between the nodes themselves during the operation of the distributed cloud application. If application designers would like their applications to be self-contained in controlling the dynamic behavior of the application (e.g., load-balancing and fail-over aspects), one of the nodes may be designated for that purpose and can take on the role of the dynamic application node coordinator. This specific node may be the first node to be deployed (most likely in the private cloud environment, though not necessarily so). This "coordinator" node may act on such activities as, for example, dynamic load-balancing (e.g., by spawning additional instances of a particular node) and/or fail-over; start, stop, and restart of the nodes in the application; etc. The intelligence (and corresponding program logic) to accomplish that may be built into the node in certain example embodiments. Alternatively, or in addition, a vendor's management infrastructure may in some example instances monitor various nodes continuously; receive alerts from the cloud providers, e.g., on various Service-Level Agreements (SLAs) associated with the cloud application nodes, etc.; and initiate load-balancing, fail-over, stop, restart, and/or other activities as appropriate, based on corresponding descriptions in an example DCADS implementation. The coordinator node in the application and/or the central management infrastructure may, however, leverage the native facilities of the specific cloud providers for the life-cycle management of the cloud application nodes deployed into the providers. It is noted that certain example may or may not predefine or prescribe the interfaces and the associated interaction protocol to accomplish node coordination functionalities.

The example DCADS may, for example, provide for machine processable rendering of a cloud application, as described above, together with its node composition, properties on the nodes, implementation references, interfaces exposed and invoked by each of the nodes, and binding associated with these interfaces (e.g., via REST, SOAP, and WS-* in general).

This approach is referred to herein as machine processable rendering of the DCADS instance. Supporting artifacts associated with a cloud application that are referenced from the DCADS instance (e.g., implementation references), Service Component Architecture (SCA) artifacts (if any), semantic definitions possibly in RDF (if any), etc., may be archived together (e.g., on a node-by-node basis) in a portable form (such as zip archives, for example) for portability. They may also be retrieved by dynamically dereferencing the URIs in the associated properties by the cloud deployment tool, during or prior to the deployment step. The machine processable rendering of the cloud applications described in example DCADS implementations enables automated processing by deployment tools that perform the actual deployment of the cloud applications into the heterogeneous cloud provider environments.

Certain example embodiments use the XML format for machine processable rendition of the cloud application described in example DCADS implementations. However, it will be appreciated that other example embodiments may use alternatives to XML, and it also will be appreciated that a specific structural rendering of the DCADS is not strictly necessary. Rather, any appropriate technology, language, and/or structure as apt for a specific enterprise environment may be chosen for the machine processable representation of the cloud applications as prescribed in an example DCADS implementation.

The properties on the nodes that specify the requirements on a cloud provider can be used to find a match for a specific cloud provider. Cloud providers may make their capabilities available and publish in standard (e.g., simple XML) forms, so that discovery of a matching provider can be automated; that is, matching the requirements as specified in the application (node) can be automatically matched with the published properties of a cloud provider when such mappings are known a priori.

Because the concept of declaring capabilities matrices at different levels (e.g., IaaS, platform as a service or PaaS, etc.) of a cloud provider does not exist in a standard form that is adopted across the board for all (or even most) cloud providers, certain example embodiments involve creating in-house or local versions of capability-matrices for all potential cloud providers with which a vendor's cloud applications can work. A single capabilities matrix may be provided for each provider, or multiple matrices may be provided for multiple providers in different scenarios. The capability requirements set of the cloud applications in example DCADS implementations can then be matched with the in-house created capability matrices of potential cloud providers.

The application (or node thereof) may also have a property that defines a list of specific cloud providers that are preferred or considered a match by the application designer. The list could be just "one" provider. If only one provider is listed and that provider is discovered to not satisfy the specified requirements of a node, however, the deployment of the node and hence the application could fail.

If it is desired that a multiple instances of a cloud application node are created when the application is deployed itself (e.g., instead of dynamically spawning new instances), an "Initial-instance-cardinality" property may be specified on the cloud application node. If a cloud application node is expected to have more than one instances simultaneously, other related properties may be specified such as, for example, "Max-instance-cardinality" and criteria for spawning a new instance (e.g., specified as application logic) that is either used by the coordinator node of the application or the enterprise cloud application management/deployment tool, the latter if it is initial cardinality and the former if it is dynamic spawning with max cardinality.

Other properties on the cloud application nodes may include, for example, the "Deployment-Order" property. The Deployment-Order property may take values 1 and above. The "max" value of a Deployment-Order property may not exceed the number nodes in a cloud application definition (as in example DCADS implementations). If there is a coordinator node in the cloud application, the coordinator node may have a value of "1" for the Deployment-Order property, and no other node in the cloud application can have a value of "1" for the Deployment-Order property; correspondingly, all other nodes may have a value of greater than 1. If multiple nodes have the same value for Deployment-Order property, it would seem that it is the desire of the application designer that all those nodes be deployed (and started simultaneously). In this case, the deployment can be started simultaneously or in quick sequence; but when a particular node is actually ready, fully deployed, and functional, may depend on the cloud provider environment's provisioning speed, network latency, etc. In general, nodes with a Deployment-Order property value of 'N' may be deployed prior to attempting the deployment of nodes with Deployment-Order property value of N+1 and above.

It is noted that the tool used to create the FIG. 2 composition may be considered software running on a hardware computer system including processing resources such as at least one processor and a memory. In certain example embodiments, the at least one processor may be configured to execute this software design tool. For instance, the at least one processor may be configured to accept user input related to the node design, properties, implementations, details, etc. It also may be able to generate a machine processable rendering of the defined cloud application, example details of which are provided in greater detail below.

Figure 3:
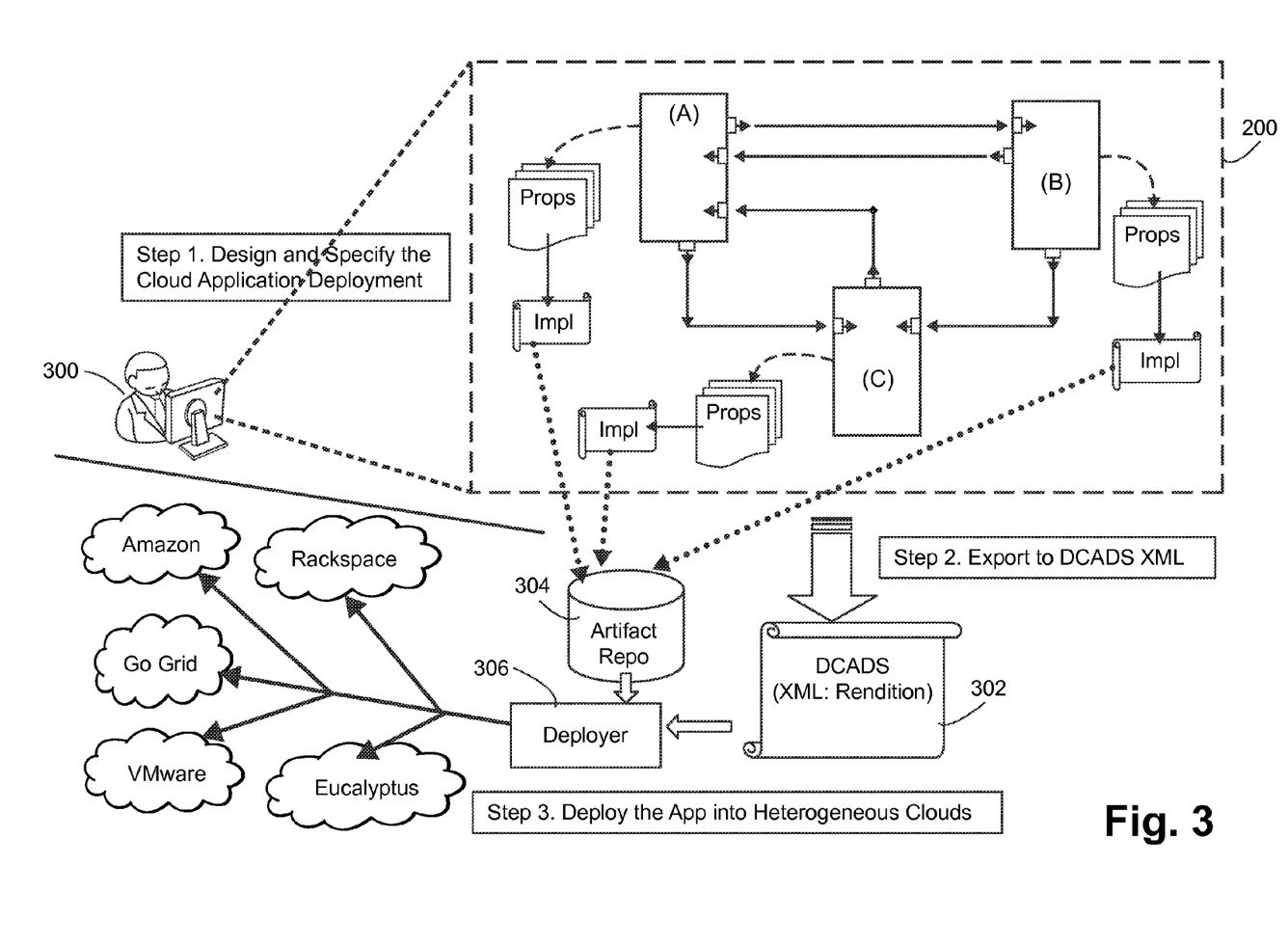
FIG. 3 provides an overview of the cloud application Distributed Cloud Application Deployment System (DCADS) lifecycle in accordance with certain example embodiments.

FIG. 3 provides an overview of the cloud application DCADS lifecycle in accordance with certain example embodiments. As shown in FIG. 3, the first step in creating and deploying a distributed cloud application in certain example DCADS implementations involves the creation of formal description of the cloud application as described above, e.g., in connection with FIG. 2. That is, the cloud application's formal representation with its constituent nodes and the properties and interfaces, etc., in a machine processable form, is created. A designer (or design team) 300 may use a DCADS design/composition tool to define the cloud application node composition, specify various kinds of properties on each node, the interfaces exposed and consumed by the nodes, match/wire together invoking and invoked node interfaces, etc. The cloud application composition designer tool may also facilitate exporting the cloud application deployment to its machine processable form (e.g., in XML), thereby creating the DCADS application's machine processable rendition 302. Implementation artifacts may also be generated and stored to an artifact repository 304 in certain example embodiments. The tool may also be able to import an existing (or intermediate) version of a DCADS rendition, for further manipulation and refinement.

It will be appreciated that DCADS and the tool used to define the cloud application deployment design may be concerned with "deployment" aspects of the cloud application, specifically into a distributed (heterogeneous) cloud environment. DCADS and associated tools need not be used in "development" or implementation of a cloud application, although in certain example scenarios, the DCADS definition may be used as a starting point for development of the implementation of application logic itself, e.g., in a top-down design scenario. That is, in certain example scenarios, the application node composition, interfaces, etc., are designed, and the application logic for the individual nodes may be implemented (and/or tested), and the implementations may ultimately be attached to the nodes of the application.

The exported DCADS machine processable rendition 302, along with the implementation artifacts for the various cloud application nodes stored in the artifact repository 304, may be retrieved by a Cloud Application Deployer 306. The deployer 306 is a tool that helps facilitate the deployment of the cloud application into the distributed and heterogeneous cloud environments as prescribed in example DCADS implementations. It is noted that the deployer 306 may be considered software running on a hardware computer system including processing resources such as at least one processor and a memory. In certain example embodiments, the at least one processor may be configured to execute the deployer software. For instance, the at least one processor may be configured to read the machine processable rendering of the defined cloud application, and initiate the deployment as appropriate. The deployer tool may be a part of the designer tool in certain example scenarios. In certain example embodiments, these tools may be separate tools that are run on the same or different computer systems.

Figure 4:
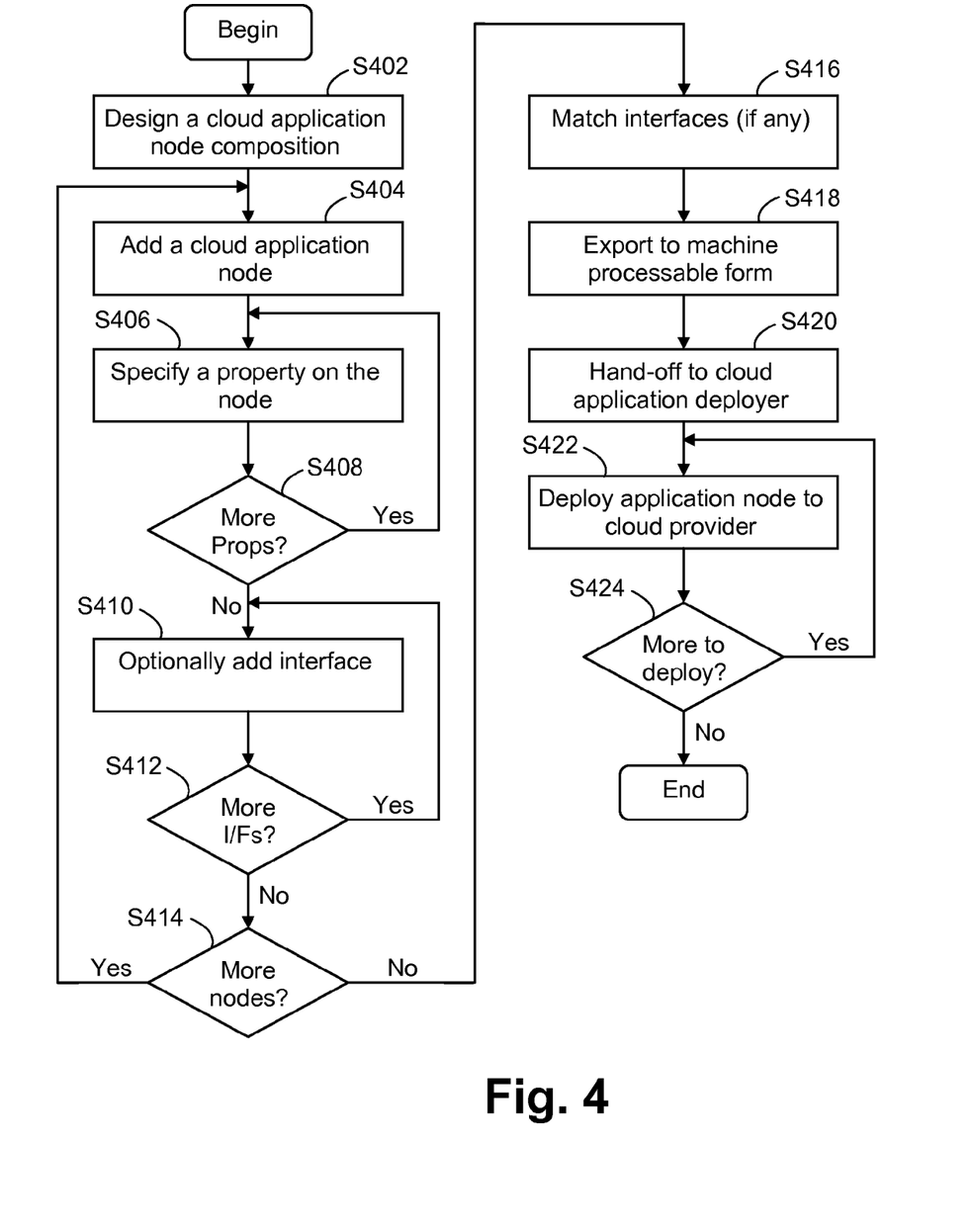
FIG. 4 is an example flowchart for creating and deploying a DCADS application in accordance with certain example embodiments.

FIG. 4 is an example flowchart for creating and deploying a DCADS application in accordance with certain example embodiments. A cloud application node composition is conceptually designed in step S402. A cloud application node is then added into a design tool in step S404. Properties on the node may be specified, for example, the nature of the application, configuration and requirements on the cloud provider environments that these application units may be deployed into, and/or the like. A first property is specified on the node in step S406. If it is determined in step S408 that there are more properties to be specified (e.g., because some required properties have not yet been specified, if a designer indicates that there are further properties to be specified, etc.), the process loops back to step S406 and a further property can be defined. On the other hand, once all properties are defined, an interface (e.g., whether the node is to be exposed to, or is to invoke, another node) may be added in step S410. If it is determined in step 412 that there are further interfaces to be specified, the process loops back to step S410 and a further interface can be specified. On the other hand, once all interfaces are setup, further nodes can be added, as appropriate. That is, a determination will be made in step S414 as to whether the process should loop back to step S404 and allow further nodes to be added, or whether the main elements have been added to the cloud and the next steps can be taken. The interfaces may be matched up in step S416, e.g., such that a node's exposed interfaces are associated with or anchored to one or more other nodes' invoking interfaces.

Once the conceptually designed cloud computing environment is fully designed in the design tool, the DCADS application's machine processable rendition and/or associated implementation artifacts may be exported in a predefined format (such as XML) in step S418. The rendition and associated artifacts may be passed to the cloud application deployer in step S420. The cloud application deployer may then attempt to deploy the application nodes to the cloud providers. For instance, in step S422, the deployer may scan the rendition to locate a specified preferred or at least seemingly compliant provider, and then send the node to that provider. If not, then If it is determined in step S424 that there are more nodes to deploy, the process loops back to step S422 so that the next node can be passed out by the deployer. If, however, there are no more nodes to pass out, then the process is ended.

In one or more steps not shown, checks may be made to determine whether the individual node deployments are successful, and/or whether the nodes are communicating with each other as expected. This may be done as the nodes are passed out, once all nodes are passed out, and/or at other suitable times. Errors or abnormalities may be documented for the deploying user or team (who may be the same or a different person or include the same or different team members as the designer(s)). If, for example, a node cannot be deployed to a preferred provider, it may be passed to a second-most preferred provider, if one is specified. Other default rules may be put into place, e.g., such that system-wide provider preferences are set based on the designer's predilections, anticipated or actual performance, proximity to and/or interactivity with other providers, etc. Further detailed examples are provided below.

In certain example embodiments, once an app-node is successfully deployed, the "deployer" may obtain the network address (e.g., access the URL) of the deployed app-node from the cloud provider. Once all nodes are successfully deployed, the deployer may convey the location (e.g., the network may access URL details) of each app-node to other app-nodes in the distributed cloud application definition based on, for example, the interface matching specification in the DCADS definition. For this, all app-nodes that need to invoke other app-nodes may specify a custom administrative-interface called adminInterface, with an operation called appNodeURL that takes parameters that (i) identity of the app-node, and (ii) access URL. The adminInterface may also have other operations to manage the lifecycle of the app-node, such as start, stop, and re-start.

If an app-node fails to deploy, the deployer has several options. For example, based on the criteria specified in the DCADS description, the deployer may discontinue the deployment process and/or shut-down (stop) any app-nodes already deployed, or the deployer may report the error and continue with the deployment of other app-nodes (if any). In either scenario, the administrator may have the option to check the error conditions, take any rectifying actions, and re-try the deployment including, for instance, either the entire cloud application or just the previously failed nodes. For facilitate the latter, the deployer may support starting specific app-node(s) in addition to deploying the entire cloud applications (all app-nodes in one pass).

Depending on the application scenario, an app-node may start functioning when it is deployed, only after all app-nodes in the cloud application have been deployed, etc. If the latter is the desired scenario, then the adminInterface of the app-nodes may support an additional operation called "productionReady". Upon receiving a "yes" value with the "productionReady" operation, the app-node can go into production (fully functional to serve its purpose) state. In other scenarios, an app-node may start functioning when instructed to do so.

If a designated "coordinator" app-node exists in the cloud-application, the deployer may also communicate to the coordinator app-node access URIs of all the nodes that are to be managed for dynamic load-balancing failover behavior. The deployer may once again use the adminInterface of the coordinator app-node (e.g., the first app-node to be deployed), to convey the network access-URLs of the app-nodes to be managed for dynamic load-balancing and fail-over.

It will be appreciated that certain example embodiments may be performed the above-described and/or other steps in different orders. For instance, some or all nodes may be added before some or all properties and/or interfaces are set up, some or all interfaces may be set up before some or all properties are defined, etc. Interface matching may be performed at any appropriate time. In some cases, a further validation step may be performed before allowing an export to machine processable form, before deployment, etc., in the event that errors are detected or suspected (e.g., an incomplete matching of interfaces, seemingly incorrect property specification, multiple nodes being specified as coordinator nodes, etc.).

Figure 5A:
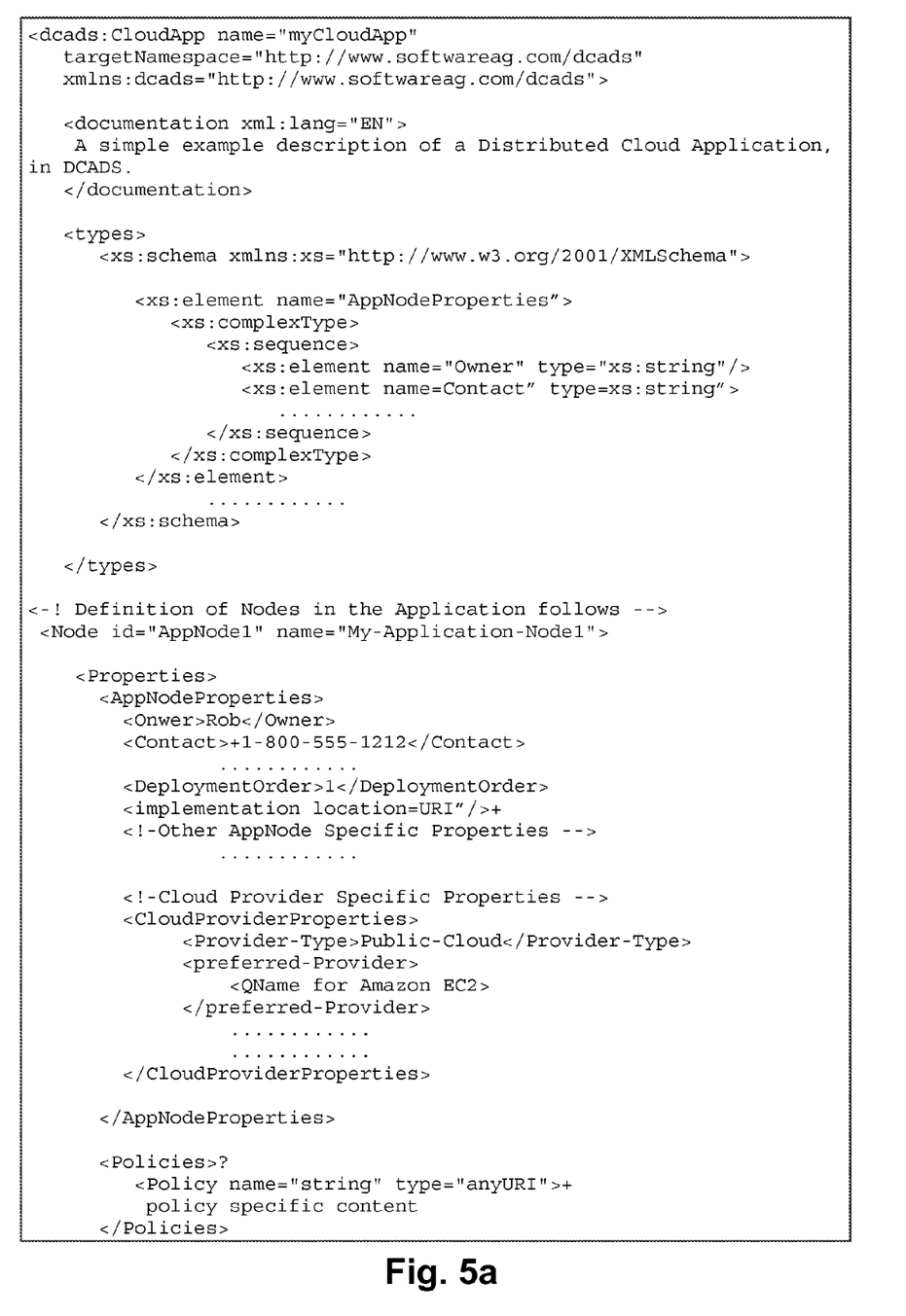
Figure 5C:
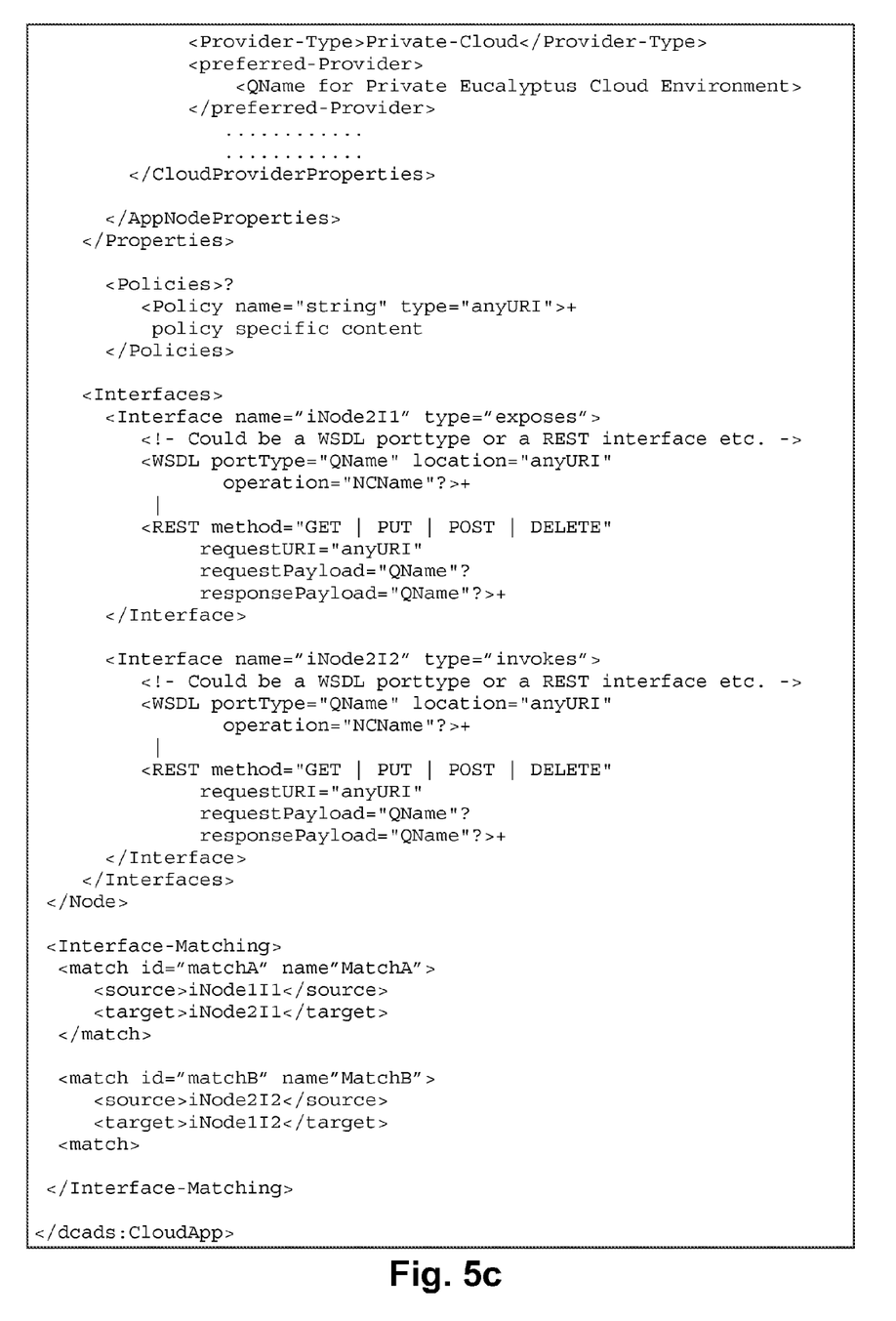

FIGS. 5a-c show example DCADS XML rendition in mixed pseudo-schema form in accordance with certain example embodiments. As can be seen from the example provided in connection with FIGS. 5a-5c, a plurality of applications nodes (namely, AppNode1 and AppNode2) are defined. Each application node has certain properties specified therein, namely, owner information and contact information. Deployment orders are specified. In this case, AppNode1 has its DeploymentOrder property set to 1, indicating that it is the coordinator node and must be instantiated first. Other application node specific properties may be specified. Relevant policies also are set for each node.

Both application nodes include cloud provider properties. In the case of AppNode1, its cloud provider properties indicate that it is a part of the public cloud, and that its preferred provider is Amazon EC2. In the case of AppNod2, its cloud provider properties indicate that it is a part of a private cloud, and that its preferred provider is the Private Eucalyptus Cloud Environment.

The interfaces that are invoked and exposed by each node also are specified therein. An interface matching section that is separate from the application node specifications also is provided. This separate interface matching section lists source and target node interfaces for a given match.

Figure 6:
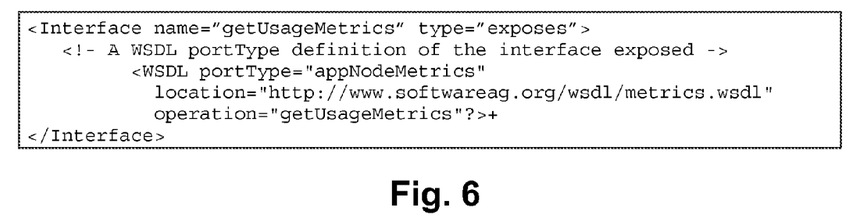
FIG. 6 is an example exposed interface in accordance with certain example embodiments.

FIG. 6 is an example exposed interface in accordance with certain example embodiments. The FIG. 6 example includes corresponds to an app-node exposing an interface called getUsageMetrics, which may be used to returns the usage metrics of the app-node.

Figure 7:
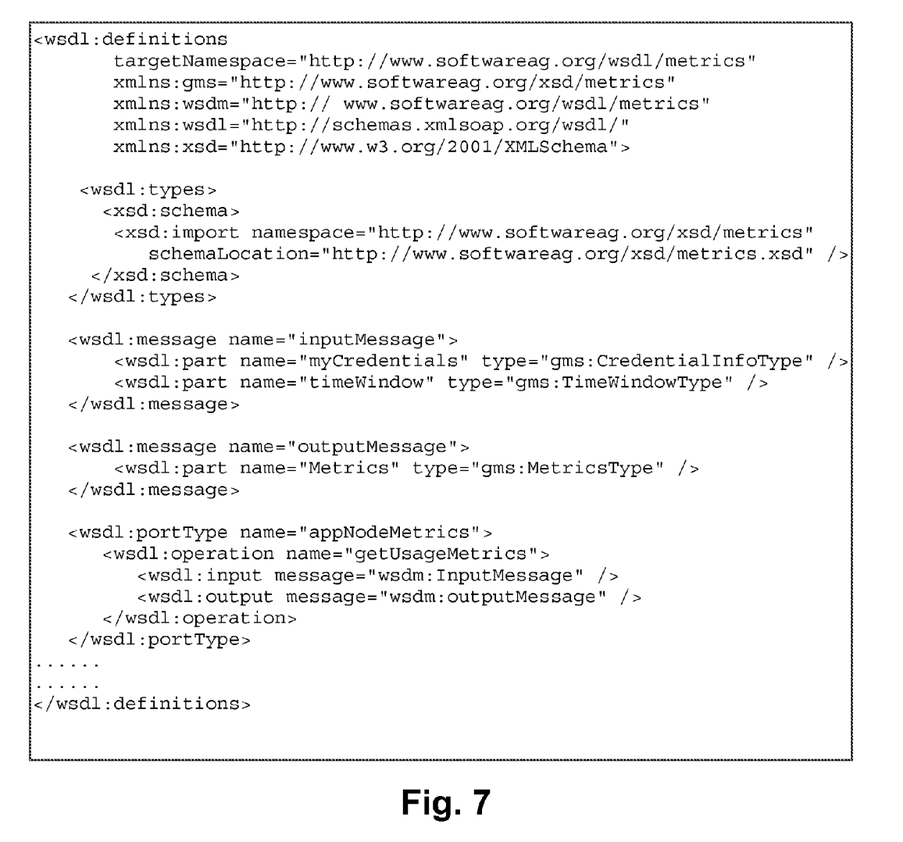
FIG. 7 is an excerpt from the WSDL referred to in the FIG. 6 example.

Following on the FIG. 6 example, the WSDL document at http://www.softwareag.org/wsdl/metrics.wsdl includes the complete WSDL definition for the respective interface. FIG. 7 is an excerpt from the WSDL referred to in the FIG. 6 example.

FIG. 8 sets forth additional properties that may be defined on an example app-node in accordance with certain example embodiments. As can be seen, the properties that may be specified include primitives and/or overview concepts that may used, for example, in helping to determine where in the cloud an application can be deployed. However, more detailed properties may be used to specify a sort of contract, e.g., as to how the application can be run on the particular part of the cloud, optionally specifying the timing (in terms of dates and/or times), etc. Further properties including, for instance, the communications within the clouds, organization aspects, etc., can be used in terms of application and/or application node deployment as a step towards more complete cloud control. In these veins, the FIG. 8 example specifies a security environment, an authentication system, access control properties, a messaging system, a storage system, etc. Other properties may, of course, be specified in these and/or other veins.

It will be appreciated that as used herein, the terms system, subsystem, service, programmed logic circuitry, tool, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A computer-implemented method for setting up a cloud application in a heterogeneous distributed cloud provider environment including multiple computer systems, the computer systems being operated by different cloud providers, the method comprising:
   defining the cloud application in terms of constituent application nodes, each said application node representing a part of the cloud application that is to be deployed into a single one of said computer systems in the heterogeneous distributed cloud provider environment that satisfies deployment requirements of that application node;
   defining properties identifying deployment requirements of, and application level instantiation logic for, each said application node;
   exposing, for each said application node, any interfaces that are invokable by one or more other application nodes;
   identifying, for each said application node, any interfaces that it will invoke on one or more other application nodes; and
   matching exposed interfaces and complementary invokable interfaces so as to enable communications to take place between the respective nodes via the matched interfaces.

2. The method of claim 1, wherein the properties are defined as <Name, Value> pairs on the application nodes.

3. The method of claim 1, wherein the properties of at least one said application node include at least one pointer to an artifact associated with the at least one application node.

4. The method of claim 3, wherein the at least one pointer refers to a standards-based policy when the associated property identifies a deployment requirement.

5. The method of claim 3, wherein the at least one pointer refers to executable code and/or executable components external to the at least one application node when the associated property relates to application level instantiation logic.

6. The method of claim 3, wherein the at least one pointer is a URI.

7. The method of claim 1, wherein, for each said application node, all exposed interfaces are matched with complementary invokable interfaces.

8. The method of claim 1, further comprising specifying a secure communication mechanism to be used for communications between at least two application nodes via interfaces associated therewith.

9. The method of claim 1, further comprising designating one application node to serve as a coordinator node, the coordinator node being configured to influence the dynamic behavior of the application.

10. The method of claim 9, wherein the coordinator node is configured to influence the dynamic behavior of the application via dynamic load-balancing and/or controlling fail-over.

11. The method of claim 9, wherein program logic for influencing the dynamic behavior of the application is built into or associated with the coordinator node, and/or associated with the computer system in which the coordinator node is located.

12. The method of claim 1, further comprising generating a machine processable rendering of the defined cloud application, the machine processable rendering including descriptions of the application nodes constituting the cloud application including their respective properties and exposed and invokable interfaces, as well as the matches between the exposed interfaces and the complementary invokable interfaces.

13. The method of claim 12, wherein the machine processable rendering is generated in an XML format.

14. The method of claim 12, further comprising deploying the application nodes to the computer systems in the heterogeneous distributed cloud provider environment based in part on the machine processable rendering.

15. The method of claim 14, wherein the application nodes are deployed to computer systems identified as being their preferred computer systems, if possible.

16. The method of claim 14, wherein multiple instances of a given application node are creatable during deployment based on an initial instance cardinality property for that given application node.

17. The method of claim 14, wherein the application nodes are deployed in accordance with a specified deployment order.

18. The method of claim 1, further comprising retrieving supporting artifacts associated with the defined cloud application.

19. The method of claim 18, further comprising packaging together retrieved supporting artifacts.

20. The method of claim 18, wherein supporting artifacts are retrieved by dereferencing URIs associated therewith.

21. A computer-implemented method for setting up an application in a cloud computing network environment in which different cloud providers operate respective computer processing systems, the method comprising:
receiving, prior to deployment of the cloud application, a definition of the cloud application that includes a list of its constituent nodes, each said node representing a part thereof that is to be deployed into a single one of said computer processing systems, the definition including lists of predefined deployment requirements of, and application level instantiation logic for, each said node, as well as matches between exposed and invokable interfaces of complementary ones of said nodes;
deploying the nodes to the computer processing systems operated by the different respective cloud providers in dependence on the definition of the cloud application, such that the nodes are able to operate on the computer processing systems to which they are deployed, given requirements of the nodes and capabilities of the computer processing systems, the capabilities of the computer processing systems depending at least in part on the processors and infrastructure configurations thereof;
obtaining network addresses for successfully deployed nodes; and
selectively transmitting obtained network addresses between deployed nodes that have matched exposed and invokable interfaces.

22. A non-transitory computer storage medium tangibly storing instructions that, when executed by at least one processor of a computer, perform the method of claim 1.

23. A cloud application design system for setting up a cloud application in a heterogeneous distributed cloud provider environment including multiple computer systems, the computer systems being operated by different cloud providers, the cloud application design system comprising:
at least one processor;
a user interface operating under the control of the at least one processor and configured, prior to deployment of the cloud application, to receive input:
defining the cloud application in terms of constituent nodes, each said node representing a part of the cloud application that is to be deployed into a single one of said computer systems in the heterogeneous distributed cloud provider environment that satisfies deployment requirements of that node, at least some of the deployment requirements being indicative of resources of and/or included in the respective computer system into which the node is to be deployed, the resources being external to the cloud application and any nodes of the cloud application,
defining properties identifying deployment requirements of, and application level instantiation logic for, each said node,
indicating, for each said node, one or more interfaces thereof that are to be exposed as invokable by one or more other nodes,
identifying, for each said node, one or more interfaces thereof that it will invoke on one or more other nodes, and
indicative of how exposed interfaces are to be matched to complementary invokable interfaces as between the nodes that define the cloud application;
a first storage location configured to store the input in a predefined format; and
a second storage location configured to store artifacts used in supporting the application level instantiation logic of the nodes,
wherein each said computer system in the heterogeneous distributed cloud provider environment is a cloud operated by a different cloud provider.

24. The system of claim 23, wherein the properties are defined as <Name, Value> pairs on the nodes.

25. The system of claim 24, wherein the value part of at least some of said pairs are URIs.

26. The system of claim 23, wherein the user interface is configured to accept further input specifying a secure communication mechanism to be used for communications between at least two nodes via interfaces associated therewith.

27. The system of claim 23, wherein the user interface is configured to accept further input designating one node to serve as a coordinator node to be configured to influence the dynamic behavior of the application by initiating dynamic load-balancing and/or controlling fail-over.

28. The system of claim 23, wherein the at least one processor is further configured to cause the nodes to be deployed to the computer systems in the heterogeneous distributed cloud provider environment based in part on the user input stored in the predefined format.

29. The system of claim 23, wherein the at least one processor is further configured to deploy the nodes to computer systems that it determines meet specified requirements for the nodes, optionally taking into account user specified preferences for individual node deployments.

30. The system of claim 23, wherein the at least one processor is further configured to create multiple instances of a node based on a user-specified cardinality property and/or deploy nodes in accordance with a user-specified deployment order.

* * * * *